(12) United States Patent
Abdollahi et al.

(10) Patent No.: US 9,913,507 B2
(45) Date of Patent: Mar. 13, 2018

(54) RETRACTABLE DISPLAYS FOR HELMETS

(71) Applicant: Intel Corporation, Santa Clara, CA (US)

(72) Inventors: Hamad Abdollahi, Vancouver (CA); Raymond C. M. Leung, Vancouver (CA)

(73) Assignee: Intel Corporation, Santa Clara, CA (US)

( * ) Notice: Subject to any disclaimer, the term of this patent is extended or adjusted under 35 U.S.C. 154(b) by 1137 days.

(21) Appl. No.: 14/075,982

(22) Filed: Nov. 8, 2013

(65) Prior Publication Data
US 2014/0130241 A1    May 15, 2014

Related U.S. Application Data

(60) Provisional application No. 61/724,962, filed on Nov. 10, 2012.

(51) Int. Cl.
*A42B 3/04* (2006.01)
(52) U.S. Cl.
CPC .................................. *A42B 3/042* (2013.01)
(58) Field of Classification Search
CPC ............ G02B 27/0176; G02B 27/0172; G02B 27/017; G02B 2027/0132; G02B 2027/0138; G02B 2027/014; G02B 27/01; G02B 2027/0154; G02B 23/125; H04N 13/044
See application file for complete search history.

(56) References Cited

U.S. PATENT DOCUMENTS

| | | | |
|---|---|---|---|
| 4,364,636 A | * | 12/1982 | Ellis ....................... A42B 3/042 2/6.2 |
| 4,757,714 A | | 7/1988 | Purdy et al. |
| 5,162,828 A | | 11/1992 | Furness et al. |
| 5,266,930 A | | 11/1993 | Ichikawa et al. |
| 5,856,811 A | | 1/1999 | Shih et al. |
| 6,441,846 B1 | | 8/2002 | Carlbom et al. |

(Continued)

FOREIGN PATENT DOCUMENTS

| | | |
|---|---|---|
| DE | 10234333 A1 | 2/2004 |
| DE | 10307324 B3 | 8/2004 |
| WO | 2008/027415 A2 | 3/2008 |

OTHER PUBLICATIONS

Grewal et al., "Global Positioning Systems, Inertial Navigation, and Integration", Second Edition, Wiley-Interscience, ISBN—13 978-0-470-04190-1.

(Continued)

*Primary Examiner* — Viet Pham
(74) *Attorney, Agent, or Firm* — Patent Capital Group

(57) ABSTRACT

The present invention relates to a helmet that includes an outer shell, a heads-up information system that comprises a display, and an attachment assembly. The heads-up information system is movable from a storage position within the outer shell to a use position in which the display of the heads-up information system is visible by a user, without obstructing the field of vision of the user, when the helmet is worn by the user. The attachment assembly is coupled to outer shell and the heads-up information system, and is operable to move the heads-up information system between the storage position and the use position.

19 Claims, 6 Drawing Sheets

(56) References Cited

U.S. PATENT DOCUMENTS

| | | | |
|---|---|---|---|
| 6,663,155 B1* | 12/2003 | Malone | B60R 11/0229 |
| | | | 224/539 |
| 6,691,325 B1 | 2/2004 | Petersen et al. | |
| 6,924,764 B1 | 8/2005 | Chen | |
| 7,092,846 B2 | 8/2006 | Vock et al. | |
| 7,255,437 B2 | 8/2007 | Howell et al. | |
| 7,460,304 B1 | 12/2008 | Epstein et al. | |
| 7,603,255 B2 | 10/2009 | Case, Jr. et al. | |
| 2001/0049837 A1 | 12/2001 | Slack | |
| 2003/0122958 A1 | 7/2003 | Olita et al. | |
| 2004/0125047 A1 | 7/2004 | Crane et al. | |
| 2006/0048286 A1 | 3/2006 | Donato | |
| 2007/0035626 A1 | 2/2007 | Randall et al. | |
| 2008/0186255 A1* | 8/2008 | Cohen | G02B 27/017 |
| | | | 345/8 |
| 2009/0040296 A1 | 2/2009 | Moscato | |
| 2012/0002046 A1 | 1/2012 | Rapoport et al. | |
| 2012/0235902 A1* | 9/2012 | Eisenhardt | A42B 3/042 |
| | | | 345/156 |

OTHER PUBLICATIONS

Hjortsmarker, "Experimental System for Validating GPS/INS Integration Algorithms", Master's Thesis, Lulea University of Technology, 2005:307 CIV-ISSN 1402-1617.

\* cited by examiner

RETRACTABLE DISPLAYS FOR HELMETS

CROSS-REFERENCE TO RELATED APPLICATIONS

This application claims the benefit of priority under 35 U.S.C. § 119 of U.S. Provisional Patent Application No. 61/724,962 filed Nov. 10, 2012 and entitled RETRACTABLE DISPLAYS FOR HELMETS, which is incorporated herein by reference in its entirety.

FIELD

The present disclosure relates generally to a helmet that includes a retractable heads-up information system for providing information to a wearer of the helmet.

BACKGROUND

In many activities that people participate in, participants are required to wear head protection. By way of non-limiting example, many skiers, snowboarders, cyclists, football players, hockey players, and motorcyclists are required to wear helmets that may have visors.

Various prior art systems exist for providing athletes taking part in sports or other physical activities with information regarding their performance. Many current solutions such as handheld GPS devices, performance measurement units, wristwatches, and mobile phones may require the user to stop and/or remove gloves or other clothing, in order to extract the device and look at the information. This can create discomfort, waste time, cause delay and may furthermore be prone to inaccurate measurements.

Many existing electronic performance measurement devices use GPS techniques and require sensor modules mounted at various parts of the user's body. Some existing GPS based devices have the following limitations: the GPS data is prone to atmospheric delay errors; and while the GPS based position errors are generally bounded, the GPS signal can be lost when the corresponding satellites are geometrically inaccessible. Much of the available equipment includes one or more sensors attached to the limbs or equipment of the user that use wireless communication to the main unit. This can make it inconvenient to use and prone to data errors due to interference and signal attenuation. Furthermore, the output displays of current technologies are often inconvenient to access and lack user friendly interfaces.

Patents and published applications relating to methods and systems for providing users with performance information include International Patent Application Publication No. WO 2008/027415 to Orth et al., United States Patent Application Publication No. 2007/0287596 to Case, Jr. et al., U.S. Pat. No. 7,255,437 to Howell et al., U.S. Pat. No. 7,092,846 to Vock et al., U.S. Pat. No. 6,924,764 to Chen, U.S. Pat. No. 6,441,846 to Carlbom et al., U.S. Pat. No. 5,162,828 to Furness et al., U.S. Pat. No. 4,757,714 to Purdy et al., United States Patent Application Publication No. 2004/0125047 to Crane et al., German Patent DE10307324 to Herms, German patent DE10234333A to Schimpf, United States Patent Application Publication No. 2012/0002046 to Rapoport et al., U.S. Pat. No. 5,266,930 to Ichikawa et al., U.S. Pat. No. 5,856,811 to Shih et al., United States Patent Application Publication No. 2003/0122958 to Olita et al., U.S. Pat. No. 7,460,304 to Epstein et al., United States Patent Application Publication No. 2001/0049837 to Slack et al., United States Patent Application Publication No. 2007/0035626 to Randall at al., United States Patent Application Publication No. 2009/0040296 to Moscato et al., United States Patent Application Publication No. 2006/0048286 to Donato et al., U.S. Pat. No. 6,691,325 to Pelletier et al.

Improvements in helmets that provide information to wearers of such helmets are desirable.

SUMMARY

According to one aspect, there is provided a helmet that includes an outer shell, a heads-up information system, and an attachment assembly. The heads-up information system is movable from a storage position within the outer shell to a use position in which a display of the heads-up information system is visible by a user, without unduly obstructing the field of vision of the user, when the helmet is worn by the user. The attachment assembly is coupled to the outer shell and the heads-up information system, and is operable to move the heads-up information system between the storage position and the use position.

BRIEF DESCRIPTION OF THE DRAWINGS

Embodiments of the present invention will now be described, by way of example, with reference to the attached Figures, in which.

DETAILED DESCRIPTION OF THE PREFERRED EMBODIMENTS

Figure 1:
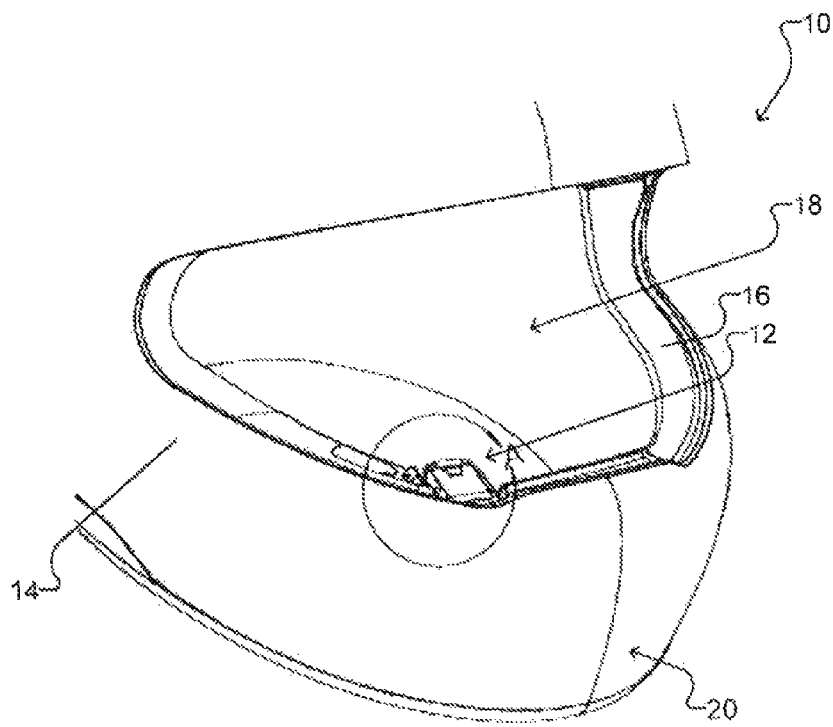
FIG. 1 is a partially cut-away, front perspective view of an embodiment of a helmet including a heads-up information system in a storage position.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to a helmet that includes a retractable heads-up information system. Examples of helmets include motorcycling helmets, cycling helmets, ski helmets, snowboard helmets, hockey helmets, and football helmets.

Figure 2:
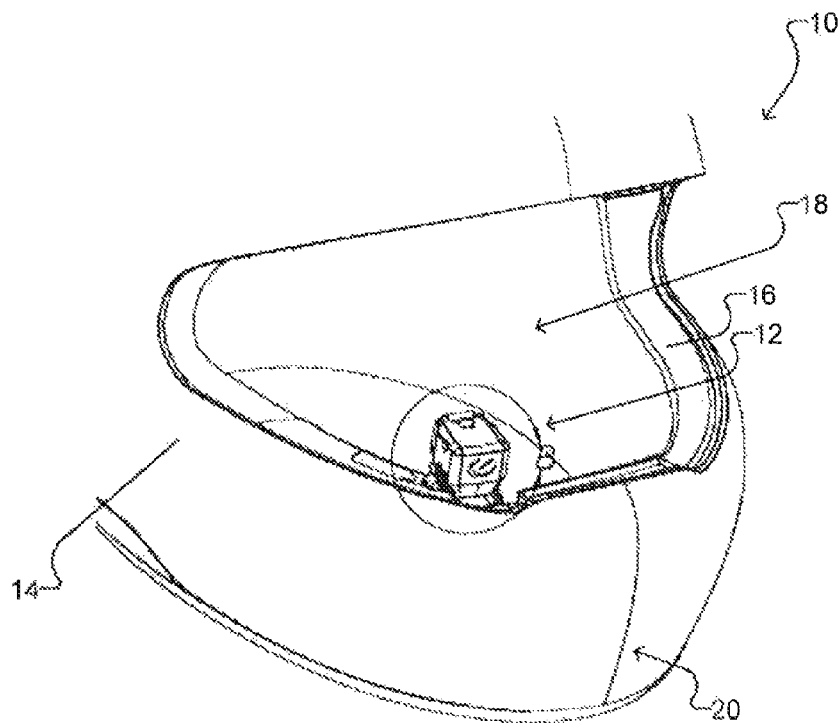
FIG. 2 is a partially cut-away, front perspective view of the helmet of FIG. 1, including the heads-up information system in a use position.

Referring to FIG. 1 and FIG. 2, partially cut-away, front perspective views of an embodiment of a helmet 10 (e.g. a motorcycle helmet) that includes a heads-up information system 12 is shown. The helmet 10 may have features of traditional helmets for a particular application. For example, the helmet 10 may be a motorcycle helmet, and the helmet 10 may have the features of traditional motorcycle helmets. Alternatively, the helmet 10 may be a cycling helmet, a ski helmet, a snowboard helmet, a hockey helmet or a football element, and may have the features of such traditional cycling, skiing, snowboarding, hockey or football helmets.

The helmet 10 comprises an outer shell 14, and an inner liner 16 that lies beneath the outer shell 14. The outer shell 14 and the inner liner 16 together define a cavity 18 that accommodates a head of a user. The outer shell 14 of the helmet 10 may be made from any suitable rigid material that protects a head of a user from kinetic forces generated by an impact when the helmet 10 is worn by the user. For example, the outer shell 14 may be made from molded acrylonitrile butadiene styrene (ABS), or plastic or composite materials, such as fiberglass, Kevlar®, and carbon fiber. The inner liner 16 may include one or more layers and is made from any suitable material that absorbs kinetic forces generated by an impact when the helmet 10 is worn by a user. For example, the inner liner 16 may be made from molded expanded polystyrene foam (EPS) and may be covered by a padded comfort liner made from cloth or leather.

In the embodiment shown in FIG. 1 and FIG. 2, the helmet 10 comprises a face-protection element 20. The face-protection element 20 may be integrally formed with the helmet 10. Alternatively, the face-protection element 20 may be detachably mounted to the helmet 10. The face protection element 20 includes an outer shell (not explicitly enumerated) and an inner liner (not explicitly enumerated) which are made from the same material as the outer shell 14 and the inner liner 16 of the helmet 10.

Optionally, the helmet 10 may include an eye-protection element (not shown), such as a visor or face shield. The eye-protection element (not shown) may be fixedly attached to the outer shell 14 of the helmet 10, or may be adjustably attached to the outer shell 14 of the helmet 10 (e.g. by pivot joints or the like), and moveable between an open configuration (not shown) in which the eye-protection element (not shown) is away from a face aperture and a user's eyes, and a closed configuration (not shown) in which the eye-protection element (not shown) is in front of the face aperture and the user's eyes. The eye-protection element (not shown) may be made of relatively colorless transparent material. Alternatively, the eye-protection element (not shown) may include a filter (not shown), such as a color filter, a darkening filter, a polarizing filter, that filters ambient light to improve visibility of a user when the user is wearing the helmet 10.

Figure 3:
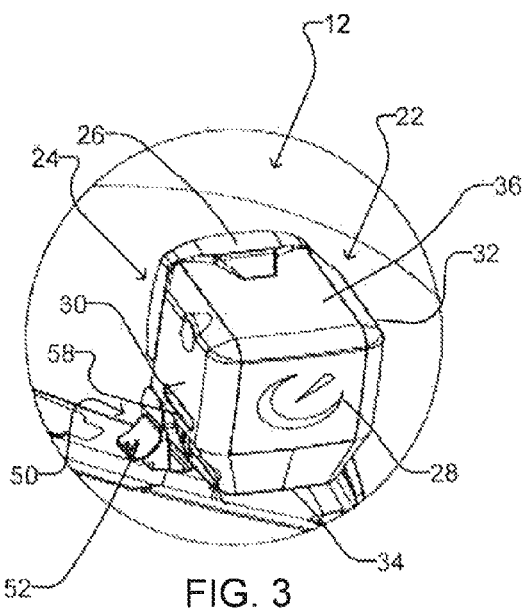
FIG. 3 is a zoomed in view of the heads-up display information system shown in FIG. 2.

Referring to FIG. 3, a zoomed in view of the heads-up information system 12 of FIG. 2 is shown. The heads-up information system 12 generally includes a housing 22, which holds a display unit 24. The housing 22 includes a front 26, a back 28, a pair of opposing side walls 30, 32 that extend between the front 26 and the back 28 of the housing 22. Bottom and top walls 34, 36 also extend between the front 26 and the back 28 of the housing 22. The display unit 24 is viewable through a recess (not explicitly enumerated) defined in the front 26 of the housing 22.

The display unit 24 comprises a display such as, for example a QVGA having a 320×240 resolution and 16 bit colors, a micro LCD illuminated by a suitable backlight, an LED display, an OLED display, an electroluminescent (EL) display, or the like. The display unit 24 may comprise a display driver (not shown) connected to the display to receive video signals from one or more processors (not shown). For example, the display unit 24 may be operably coupled to a processor mounted in the helmet 10, or may be in wireless communication with a processor mounted at a remote location, such as for example on a vehicle being driven by the user, as discussed below. The display driver is configured to generate driving signals based on the video signal, and to provide the driving signals to the display. The display may be configured to project an image defined by video signals from the processor(s). The display unit 24 may also comprise a display lens assembly (not shown) positioned to receive the image projected by the display. The display lens assembly may be configured to enlarge the projected image and/or to focus the projected image for convenient viewing by a user. In some embodiments, the display unit 24 also comprises an ambient light sensor (not shown) operably coupled to the display and/or the display driver for automatically adjusting the brightness of the display based on ambient lighting conditions. The display unit 24 may receive electrical power from one or more batteries or other power sources mounted at any suitable location in the helmet 10.

Referring again to FIG. 1, the heads-up information system 12 is shown in a storage position. In the storage position, the heads-up information system 12 is housed within the outer shell 14. The heads-up information system 12 is retained within the outer shell 14 by an attachment assembly 38 (shown in FIG. 4). The heads-up information system 12 is movable from the storage position (FIG. 1) to a use position (FIG. 2) by the attachment assembly 38 (FIG. 4), as further described below.

Referring again to FIG. 2, the heads-up information system 12 (FIG. 2) is shown in the use position. In the use position (FIG. 2), the display (not shown) of the display unit 24 is visible to the user, without unduly obstructing the field of vision of the user, when the helmet is worn by the user.

Figure 4:
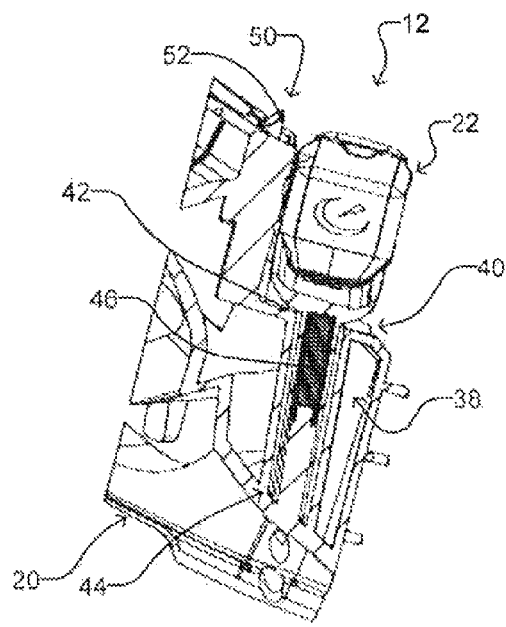
FIG. 4 is a front view of a portion of the helmet of FIG. 1, with a front surface of the outer shell of the face protection element partially removed for the purpose of illustration.

An example embodiment of the attachment assembly 38 will now be described with reference to FIG. 4 and FIG. 5. FIG. 4 shows a front view of a portion of the helmet 10 of FIG. 2, with a front surface of the outer shell (not explicitly enumerated) of the face protection element 20 partially removed for the purpose of illustration. The outer shell and the inner liner (not explicitly enumerated) of the face protection element 20 include a cut-out 40 that is shaped and dimensioned to house the heads-up information system 12 and the attachment assembly 38. The heads-up information system 12 is retained within the cut-out 40 by the attachment assembly 38.

Figure 5:
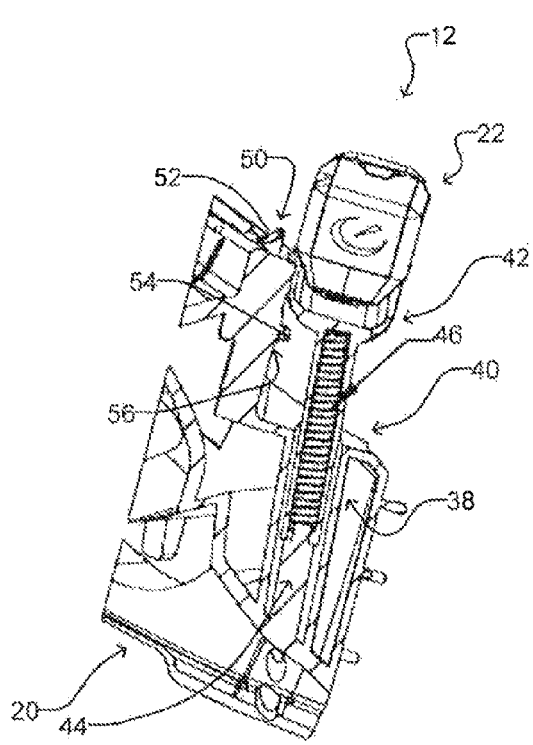
FIG. 5 is a front view of a portion of the helmet of FIG. 2, with a front surface of the outer shell of the face protection element partially removed for the purpose of illustration.

In the embodiment shown in FIG. 4 and FIG. 5, a first end 42 of the attachment assembly 38 is coupled to the housing 22 of the heads-up information system 12. A second end 44 of the attachment assembly 38 is coupled to the face protection element 20. In the illustrated embodiment, the attachment assembly 38 comprises a spring 46 that compresses and decompresses to move the heads-up information system 12 between the storage position (FIG. 4) and the use position (FIG. 5). In other embodiments, the attachment assembly may comprise other types of springs or other biasing mechanisms for moving the heads-up information system 12 between the storage position (FIG. 4) and the use position (FIG. 5). The spring 46 is compressed when the heads-up information system 12 is in the storage position (FIG. 4) and decompressed when the heads-up information system 12 is in the use position (FIG. 5). When the heads-up information system 12 is in the storage position (FIG. 4), the front 26 of the housing 22 of the heads-up information system 12 may be flush with an inner surface of the inner liner (not explicitly enumerated) of the face protection element 20 (i.e. a surface that faces a wearer of the helmet 10).

The attachment assembly 38 also comprises a latching mechanism 50 that is movable from a locking position in which the latching mechanism 50 holds the housing 22 of the heads-up information system 12 in the storage position (FIG. 4), to a releasing position in which the latching mechanism 50 is disengaged from the housing 22 of the heads-up information system 12. The latching mechanism 50 may be biased toward the locking position to hold the heads-up information system 12 in the storage position (FIG. 4).

Referring again to FIG. 3 through FIG. 5, an example embodiment of the latching mechanism 50 is shown. In the illustrated example, the latching mechanism 50 has a top end 52 which may be conveniently be operated by a user's finger, and a projection 54 near a bottom end 56. The latching mechanism 50 is pivotally mounted to the helmet 10 at a location between the top end 52 and the projection 54, such that movement of the top end 52 toward the housing 22 causes movement of the projection 54 away from the housing 22. The side wall 30 of the heads-up information system 12 may include a groove 58 that is shaped and dimensioned to mate with the projection 54 of the latching mechanism 50 and to inhibit movement of the heads-up information system 12. The latching mechanism 50 pivots from the locked position (FIG. 4) in which the projection 54 is received in the groove 58 to hold the heads-up information system 12 in the storage position (FIG. 1 and FIG. 4), to a release position (not shown) in which the projection 54 is disengaged from the side wall 30 (FIG. 2 and FIG. 5) of the housing 22 (FIG. 2) of the heads-up information system 12.

Figure 6:
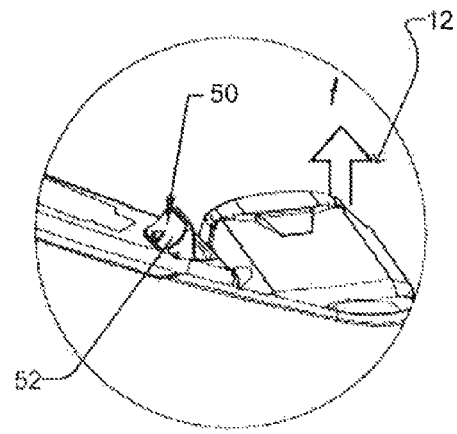
FIG. 6 is a zoomed in view of the heads-up display information system shown in FIG. 1.

FIG. 6 shows a zoomed in view of the heads-up display information system 12 shown in FIG. 1, in which the latching mechanism 50 is in the locked position. In the embodiment shown in FIG. 6, the projection 54 of the latching mechanism 50 is located within the groove 58 to hold the heads-up information system 12 in the storage position (FIG. 1 and FIG. 4).

Figure 7:
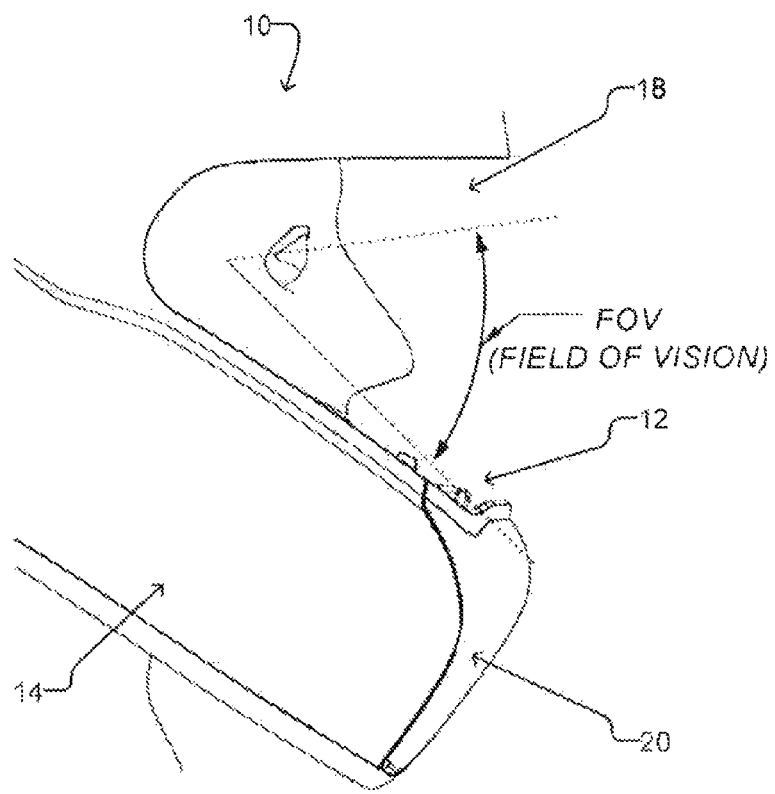
FIG. 7 is a cut-away side-view of the helmet of FIG. 1.

The movement of the heads-up information system 12 will now be described with reference to FIG. 4, FIG. 5, FIG. 7, and FIG. 8. As mentioned above, the heads-up information system 12 is shown in FIG. 4 and FIG. 7 in the storage position. To release the heads-up information system 12 from the storage position (FIG. 4 and FIG. 7), the latching mechanism 50 is released such that the latching mechanism 50 pivots from the locking position (FIG. 4) to the releasing position such that the projection 54 disengages from the groove 58 and pivots away from the housing 22. When the heads-up information system 12 is housed and retained within the cut-out 40 and the latching mechanism 50 is released, the spring 46 decompresses and the heads-up information system 12 moves from the storage position (FIG. 4 and FIG. 7), to the use position (FIG. 5 and FIG. 8) in which the heads-up information system 12 extends from the cut-out 40. In the storage position (FIG. 4 and FIG. 7), the heads-up information system 12 is outside the field of vision of a user when the helmet 10 is worn by the user. In the use position (FIG. 5 and FIG. 8), the display (not shown) of the heads-up information system 12 is visible to a user when the helmet 10 is worn by the user, without unduly obstructing a field of vision of the user.

In another example embodiment, the attachment assembly 38 may comprise a push-push mechanism (not shown) for selectively holding the heads-up information system 12 in the storage or use positions. A push-push mechanism, as referred to herein, includes any mechanism whereby the housing 22 is pushed to release the heads-up information system 12 from the storage position (FIG. 1) to facilitate movement into the use position (FIG. 2). When the heads-up information system 12 is moved from the use position (FIG. 2) to the storage position (FIG. 1), the push-push mechanism facilitates storage of the heads-up information system 12. A push-push mechanism is also known as a push-to-open and push-to-close mechanism.

Figure 8:
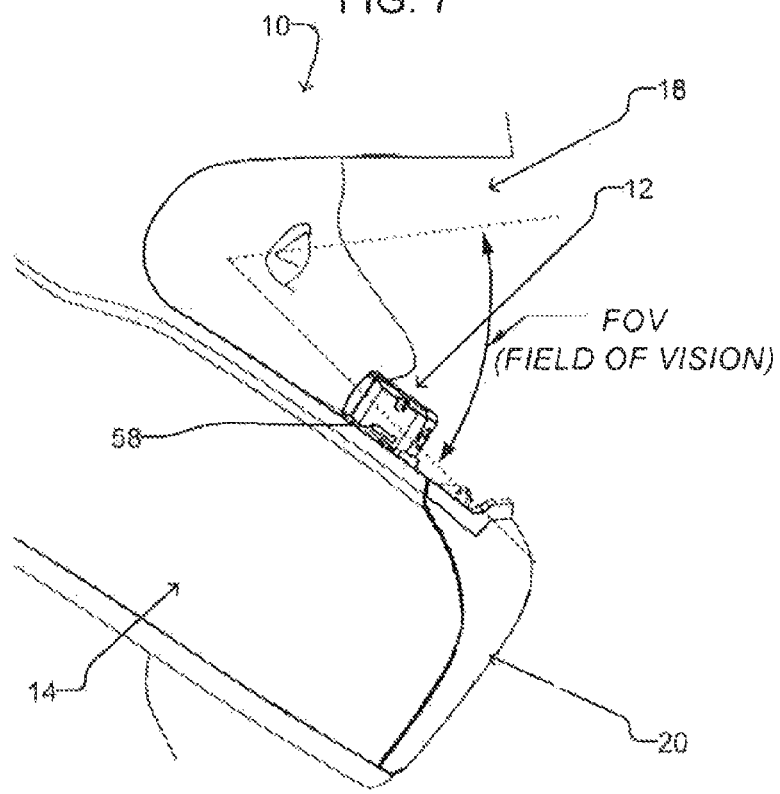
FIG. 8 is a cut-away side-view of a portion of the helmet of FIG. 2.

The movement of the heads-up information system 12 will now be described for the embodiment in which the attachment assembly 38 comprises a push-push mechanism, with reference to FIG. 7 and FIG. 8. As mentioned above, the heads-up information system 12 is shown in the storage position (FIG. 7). To release the heads-up information system 12 from the storage position (FIG. 7), the top wall 36 of the housing 22 of the heads-up information system 12 is pushed generally downwardly into the outer shell 14 to actuate the push-push mechanism. When the heads-up information system 12 is housed and retained within the outer shell 14 of the helmet 10 and the push-push mechanism is actuated, the heads-up information system 12 moves from the storage position (FIG. 7) to the use position (FIG. 8), As mentioned above, in the storage position (FIG. 7), the heads-up information system 12 is outside the field of view of a user when the helmet 10 is worn by the user. In the use position (FIG. 8), the display of the heads-up information system 12 is visible to a user when the user is wearing the helmet 10, without unduly obstructing a field of vision of the user.

In the embodiments shown and described above, the helmet 10 includes a face-protection element 20. In an alternative embodiment, the face-protection element 20 may be absent from the helmet 10. In these embodiments, the outer shell 14 and the inner liner 16 of the helmet 10 may include a cut-out at a position above or to the side of the user's field of vision (not shown) that is shaped and dimensioned to house and retain the heads-up information system 12 when the heads-up information system 12 is in the storage position.

Figure 9:
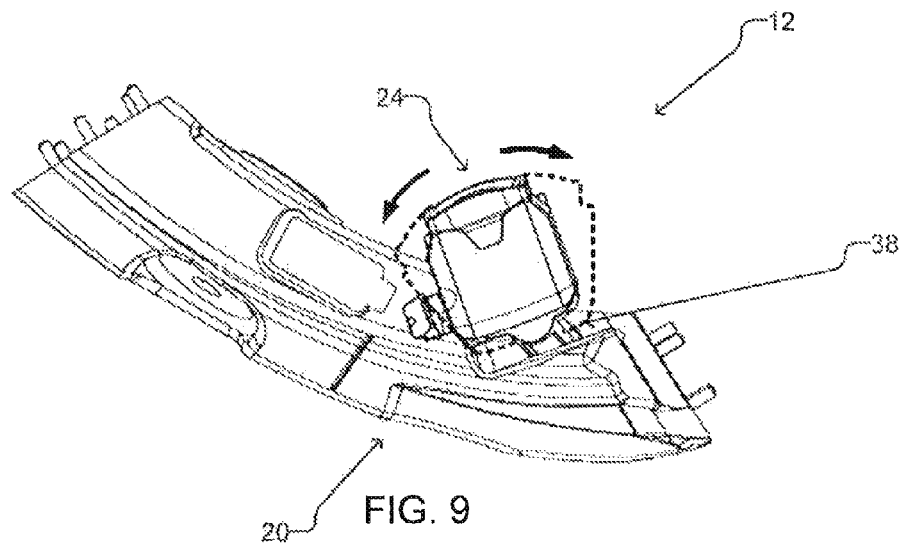
FIG. 9 is a top view of a portion of the helmet of FIG. 2, with the outer shell of the face protection element partially removed for the purpose of illustration.

Referring to FIG. 9, a top view of a portion of the helmet 10 of FIG. 2, with the outer shell of the face protection element 20 partially removed for the purpose of illustration is shown. In the embodiment shown in FIG. 9, the heads-up information system 12 is rotatably attached to the attachment assembly 38. The heads-up information system 12 may be rotated about a generally vertical axis (when the head of a user wearing the helmet 10 is generally upright) to adjust a position of the display of the heads-up information system 12 relative to an eye of a user when the user is wearing the helmet 10. The heads-up information system 12 may be rotated to adjust the yaw of the head-up information system 12 improve visibility of the display of the head-up information system 12 by a user when the user is wearing the helmet 10. In the embodiment in FIG. 9, the heads-up information system 12 may be pivoted to adjust the yaw through an angular range of about 5 degrees to about 10 degrees.

Figures 10, 11:
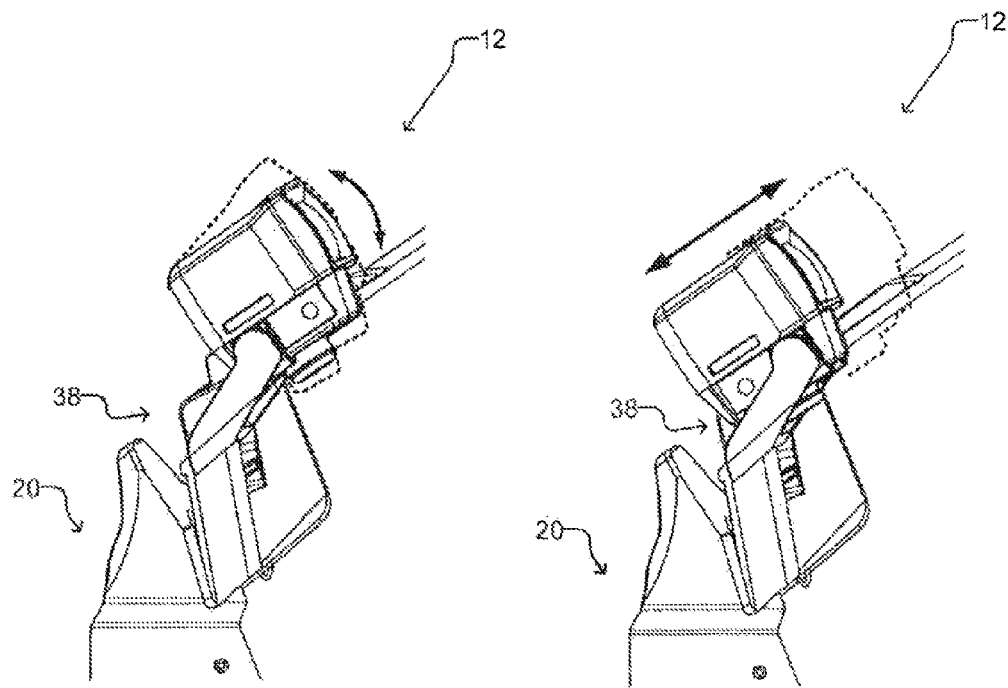
FIG. 10 is a top view of a portion of the helmet of FIG. 2, with the outer shell of the face protection element partially removed for the purpose of illustration.
FIG. 11 is a top view of a portion of the helmet of FIG. 2, with the outer shell of the face protection element partially removed for the purpose of illustration.

Referring to FIG. 10, a top view of a portion of the helmet 10 of FIG. 2, with the outer shell of the face protection element 20 partially removed for the purpose of illustration is shown. In the embodiment shown in FIG. 10, the heads-up information system 12 is pivotally attached to the attachment assembly 38. The heads-up information system 12 may be pivoted about a generally horizontal axis (when the head of a user wearing the helmet 10 is generally upright) to adjust a pitch of the display of the heads-up information system 12 relative to an eye of a user when the user is wearing the helmet 10. The heads-up information system 12 may be pivoted to adjust the pitch of the heads-up information system 12 to improve visibility of the display by a user when the user is wearing the helmet 10. In the embodiment in FIG. 10, the heads-up information system 12 may be pivoted to adjust the pitch through an angular range of about 5 degrees to about 10 degrees.

Referring to FIG. 11, a top view of a portion of the helmet 10 of FIG. 2, with the outer shell of the face protection element 20 partially removed for the purpose of illustration is shown. In the embodiment shown in FIG. 11, the heads-up information system 12 is slidably attached to the attachment assembly 38. The heads-up information system 12 may be slid generally forwardly and backwardly to adjust a position of the display (not shown) of the heads-up information system 12 relative to an eye of a user when the user is wearing the helmet 10. The heads-up information system 12 may be slid along the attachment assembly 38 to adjust a distance of the heads-up information system 12 from an eye of a user when the user is wearing the helmet 10 to improve visibility of the display (not shown) of the heads-up information system 12 by the user.

Figure 12:
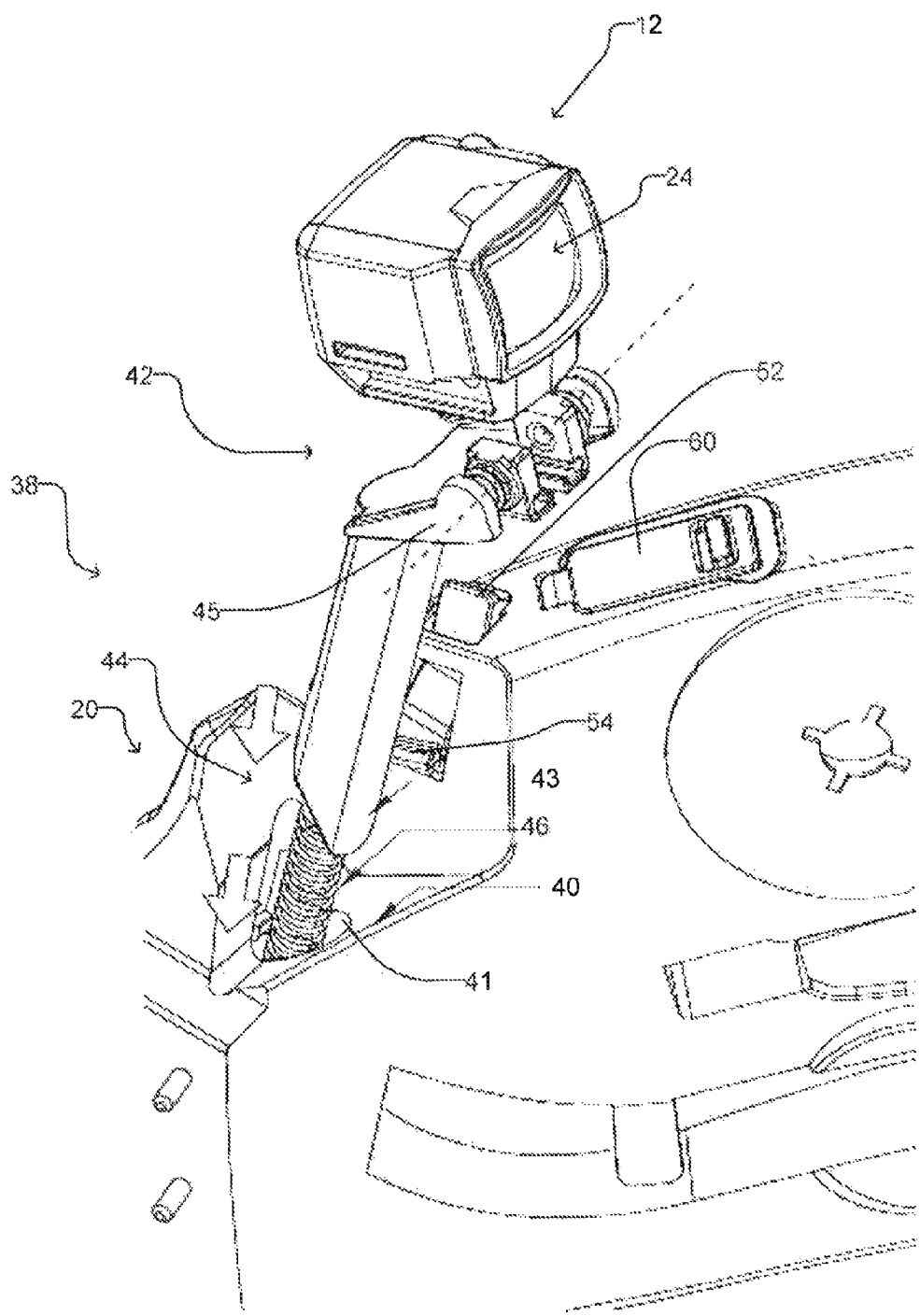
FIG. 12 and FIG. 13 show exploded views of portions of an example attachment assembly.
Figure 13:
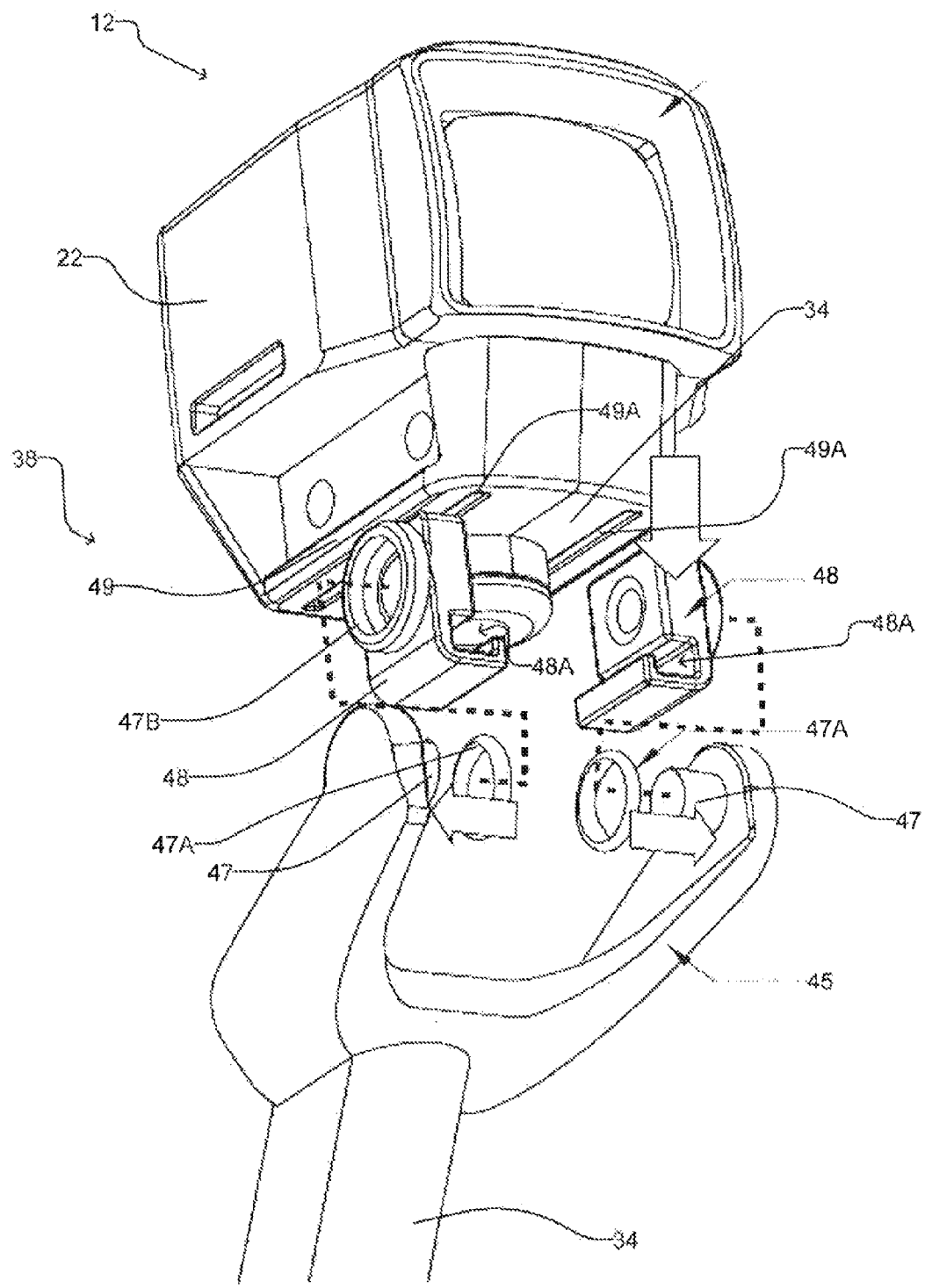

Referring to FIG. 12 and FIG. 13, which illustrate details of the attachment assembly 38 according to an example embodiment, the cutout 40 in the face protection element 20 has an opening 41 at the bottom portion thereof which is shaped and dimensioned to receive a stem 43 of the attachment assembly 38. The upper end of the stem 43 is attached to a U-shaped portion 45 for receiving the housing 22 as discussed below. The stem 43 is hollow such that the spring 46 may be received therein. The opening 41 and the stem 43 may be shaped such that the stem 43 may be pivoted slightly about its longitudinal axis to provide yaw adjustment. Yaw adjustment may be provided by other mechanisms in other embodiments, such as, for example, a pivotal coupling in the stem 43, or between the stem 43 and the U-shaped portion 45, or other mechanisms. In embodiments wherein a processor or the like is incorporated into the helmet 10, an access panel 60 may be provided to provide access to one or more ports for connecting the processor to another device.

As best seen in FIG. 13, the U-shaped portion 45 has a pair of inwardly projecting posts 47 thereon. Gaskets 47A are provided around posts 47 and fit into correspondingly-shaped pivot mounts 47B on sliders 48. Each slider 48 has a channel 48A therein which is shaped and dimensioned to slidingly engage a flange 49 on one of the lower edges of the housing 22 and a corresponding slot 49A in the bottom wall 34 of the housing 22. Pitch adjustment is provided by pivoting the sliders 48 (and thus the housing 22) about the posts 47. Adjustment of the distance of the heads-up information system 12 from the eye of the user is provided by sliding housing 22 relative to sliders 48. Pitch and eye distance adjustment may be provided by other mechanisms in other embodiments.

In the embodiments described above, the helmet 10 may also include a one or more user-interface components (not shown), such as buttons or keys, that facilitate user interaction with the heads-up information system 12. The one or more user-interface keys (not shown) may be provided on the outer shell 14 of the helmet 10. The user-interface keys (not shown) may be located on sides of the outer shell 14 or back of the outer shell 14 of the helmet 10. The user-interface keys (not shown) are configured such that each key is easily reached by a user and may be tapped or otherwise manipulated while wearing gloves to facilitate interaction with the heads-up information system 12, In other embodiments, other forms of user-interface components (not shown) may be provided in addition to or in the alternative to user interface keys (not shown). Non-limiting examples of such user-interface components (not shown) include slidable or rotatable user-interface components, joystick-type user-interface components, optical (e.g. laser or LED-based) user interface components, or the like.

The heads-up information system 12 may also be configured to receive wireless signals from a vehicle (not shown). For example, the heads-up information system 12 may include a receiver (not shown) that receives information wirelessly from one or more sensors or processors mounted on a vehicle, such as a motorcycle, utilizing a communication protocol such as Bluetooth, and displays the information to a user of the helmet 10 at any time. The information received from sensors or processors mounted on the vehicle may include, by way of non-limiting example, the speed of the vehicle, the distance traveled by the vehicle, the GPS coordinates of the vehicle, engine parameters or other operating characteristics of the vehicle (e.g., engine RPMs, the current gear, a gear switch indicator, a traction control indicator, a warning light indicator, etc.), the fuel remaining in the vehicle, the distance to the destination, the outside temperature, and the like. Alternatively or additionally, the heads-up information system 12 may receive information from other sources, such as for example SMS messages, MMS messages, and/or call information received by a mobile communication device of a user of the helmet 10.

In some embodiments, the heads-up information system 12 may be turned on and off using a user-interface key located on the outer shell 14 of the helmet 10. Once the heads-up information system 12 is powered on, the default view appears on the display of the heads-up information system, which shows information received from a vehicle as described above. The user may switch between views by pressing or otherwise interacting with user interface keys (not shown) described above. The user may customize their own view(s) by connecting the heads-up information system 12 to a personal computer or other external device. Each view may be tailored to a particular activity to provide suitable information with a minimum requirement for user interaction during the activity. The information displayed on the heads-up information system 12 may be configured by the user utilizing the user-interface components (not shown) described above. In other embodiments, a push of a user-interface key (not shown), GPS coordinates may be sent to law enforcement for fast rescue in an emergency.

In other embodiments, the heads-up information system 12 may include further electrical components, such as a sensor unit (not shown), a processor unit (not shown), and a power unit (not shown) for providing electrical power to the sensor unit and processor unit. The sensor unit (not shown), processor unit (not shown), and power unit (not shown) may be housed within the outer shell 14 of the helmet 10. Alternatively, the sensor unit (not shown), the processor unit (not shown), and the power unit (not shown) may be housed between outer shell 14 and the inner liner 16 of the helmet 10. Alternatively, one or more of the sensor unit (not shown), the processor unit (not shown), and the power unit (not shown), may be mounted on the outer shell 14 of the helmet 10, and may be protected, by suitably formed enclosures or the like. The locations of further electrical components of the sensor unit, processor unit, and power unit may be different in different embodiments. In some embodiments, the grouping of the components of electronic system into the schematic components (e.g. sensors, processor unit, and power unit) is not necessary, and the locations of these components may be distributed over a plurality of locations in helmet 10. For example, some components may be disposed on the right side of helmet 10, and other components may be disposed on the left side of helmet 10 to maintain balance of helmet 10.

The sensor unit (not shown), processor unit (not shown), and power unit (not shown) may be connected to the heads-up information system 12 by cables (not shown) comprising one or more wires or other connectors. The cables may be enclosed within channels formed between outer shell 14 and the inner liner 16 of the helmet 10, within the inner liner 16, or other suitable locations. Alternatively, the cables may be enclosed within a separate casing (not shown) disposed on the outer shell 14 of the helmet 10. In embodiments of the helmet 10 where face-protection element 20 is detachable, the cables may comprise detachable wiring connections (e.g. plugs).

The sensor unit (not shown) may comprise a 3-axis accelerometer, a 3-axis gyroscope, a GPS receiver, and a thermometer. The accelerometer and gyroscope may be collectively referred to herein as "INS" (inertial navigation system) sensors. The INS sensors and GPS receiver may have complementary strengths and weaknesses such that their combined use provides for improved reliability and accuracy of measurement of position and altitude as compared to each sensor on its own. Examples of such complementary strengths and weaknesses are described, for example, in "Experimental system for validating GPS/INS integration algorithms", Niklas Hjortsmarker, ISSN 1402-1617, and "Global Positioning Systems Inertial Navigation And Integration", 2nd edition, Mohinder S. Grewal et all. ISBN-13 978-0-470-04190-1, which are hereby incorporated by reference herein.

The accelerometer (not shown) may comprise, for example, a micro-electro-mechanical system (MEMS) device which produces digital output signals representative of linear accelerations along three perpendicular axes. In some embodiments, the accelerometer may comprise a LIS331DL motion sensor manufactured by STMicroelectonics.

The gyroscope (not shown) may comprise, for example, two MEMS devices, one of which produces analog output signals representative of angular velocities about two perpendicular axes, and one of which produces an analog output signal about a third axis perpendicular to the other two axes. In some embodiments, the gyroscope may comprise an IDG-500 for measuring angular velocities about an x-axis and a y-axis, and an ISZ-500 for measuring angular velocity about a z-axis, both of which are manufactured by InvenSense, Inc.

The GPS receiver (not shown) may comprise, for example a Wide Area Augmentation System (WAAS) enabled GPS receiver with a built-in system clock. GPS receiver may, for example, output digital signals using a protocol such as NMEA 0183 or NMEA 2000. The thermometer may comprise, for example, a digital thermometer.

The processor unit (not shown) may comprise a processor that is connected to receive signals from the accelerometer, gyroscope. GPS receiver, and thermometer of sensor unit. The processor unit may comprise an analog-to-digital converter (ADC) connected between the processor and any of the sensors of the sensor unit that produce analog signals.

The processor unit (not shown) may also comprise a memory and an input/output interface. The memory may have stored therein various computer readable instructions for use by the processor. In other embodiments, memory may be integrated into the processor. The input/output interface may be configured to support various communications protocols such as, for example, Bluetooth and/or USB, so that the processor may communicate with other electronic devices, such as on-board vehicle controllers, mobile phones, smartphones, and personal computers. The input/output interface may also be configured to receive signals produced when a user interfaces with user interface keys so that a user may interact with the processor. In other embodiments, the input/output interface may be integrated into the processor.

The processor (not shown) may be configured to transform signals received from the sensor unit to produce outputs representing various parameters relating to user performance, and other outputs. For example, the processor may produce outputs relating to position, orientation, time, speed, direction of travel, altitude, vertical drop, jump airtime, jump distance, spins, etc. The processor (not shown) may store the outputs and/or any other data in memory. The processor (not shown) may also transfer the outputs and/or any other date to another device through input/output interface. The processor may also produce a video signal defining an image to be displayed and provide video signal to the display unit. The content of video signal may be controlled by the user interfacing with user interface keys, or by another electronic device interacting with the processor through the input/output interface.

The power unit (not shown) may comprise a battery, and a power conditioning circuit (not shown). The power conditioning circuit (not shown) may receive electrical power from the battery (not shown), and output electrical power at voltages and/or currents suitable for the various components (not shown) of heads-up information system 12, the sensor unit (not shown), and/or the processor unit (not shown).

Certain implementations of the invention comprise computer processors which execute software instructions which cause the processors to perform a method of the invention. For example, one or more processors in a head mounted information system may implement the methods described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As one skilled in the art will appreciate, the example embodiments discussed above are for illustrative purposes only, and methods and systems according to embodiments of the invention may be implemented in any suitable device having appropriately configured processing hardware. Such processing hardware may include one or more conventional processors, programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like.

The helmets described herein facilitate adjustment of a heads-up information system such that a wearer of such a helmet may view information received from a vehicle or other electronic device, such as a computer or smartphone, while continuing to safely operate the vehicle.

The present disclosure may be embedded in other specific forms without departing from its essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A helmet comprising:
   an outer shell;
   a heads-up information system comprising a display, the heads-up information system movable from a storage position within the outer shell to a use position in which the display of the heads-up information system is visible by the user, when the helmet is worn by the user; and
   an attachment assembly coupled to the outer shell and the heads-up information system and operable to move the heads-up information system between the storage position and the use position;
   wherein, the use position extends up from the storage position which is disposed substantially below the user's line-of-sight.

2. The helmet of claim 1, comprising an inner liner disposed within the outer shell, wherein the outer shell and the inner liner comprise a cut-out and wherein the heads-up information system is retained with the cut-out when the heads-up information system is in the storage position.

3. The helmet of claim 1, wherein the attachment assembly comprises a spring connected to bias the heads-up information system toward the use position, a first end of the spring being coupled to a housing of the heads-up information system and a second end of the spring being coupled to the outer shell of the helmet.

4. The helmet of claim 3, wherein the spring comprises a compression spring which is compressed when the heads-up information system is in the storage position and decompressed when the heads-up information system is in the use position.

5. The helmet of claim 1, wherein the attachment assembly comprises a latching mechanism configured to retain the heads-up information system in the storage position and release the heads-up information system such that the heads-up information system moves to the use position.

6. The helmet of claim 4, wherein the attachment assembly comprises a latching mechanism configured to retain the heads-up information system in the storage position and release the heads-up information system such that the heads-up information system moves to the use position.

7. The helmet of claim 1, wherein the attachment assembly comprises a push-push mechanism for moving the heads-up information system from the storage position to the use position when the push-push mechanism is actuated.

8. The helmet of claim 1, wherein the heads-up information system is pivotally attached to the attachment assembly for adjusting a pitch of a display of the heads-up information system.

9. The helmet of claim 4, wherein the heads-up information system is pivotally attached to the attachment assembly for adjusting a pitch of a display of the heads-up information system.

10. The helmet of claim 1, wherein the heads-up information system is rotatably attached to the attachment assembly for adjusting a yaw of a display of the heads-up information system.

11. The helmet of claim 9, wherein the heads-up information system is rotatably attached to the attachment assembly for adjusting a yaw of a display of the heads-up information system.

12. The helmet of claim 1, wherein the heads-up information system is slideably attached to the attachment assembly for adjusting a distance between the heads-up information system and an eye of a user wearing the helmet.

13. The helmet of claim 11, wherein the heads-up information system is slideably attached to the attachment assembly for adjusting a distance between the heads-up information system and an eye of a user wearing the helmet.

14. The helmet of claim 1, wherein the heads-up information system comprises a wireless receiver for receiving information from a vehicle, and the heads-up information system is configured to display the information received from the vehicle on the display.

15. The helmet of claim 14, wherein the heads-up information system comprises a Bluetooth receiver for wirelessly receiving information from the vehicle.

16. The helmet of claim 1, comprising a power unit disposed in the outer shell for providing power to the heads-up information system.

17. The helmet of claim 1, comprising a face-protection element comprising an outer shell and an inner liner, and wherein the attachment assembly is coupled to the outer shell of the face-protection element.

18. The helmet of claim 1, comprising an eye-protection element.

19. The helmet of claim 1, wherein the outer shell comprises at least one user-interface controller for interacting with the heads-up information system.

* * * * *